(12) United States Patent
Yoshio

(10) Patent No.: US 8,115,461 B2
(45) Date of Patent: Feb. 14, 2012

(54) POWER SUPPLY CIRCUIT AND BATTERY DEVICE

(75) Inventor: Katsura Yoshio, Osaka-Fu (JP)

(73) Assignee: Texas Instruments Incorporated, Dallas, TX (US)

( * ) Notice: Subject to any disclaimer, the term of this patent is extended or adjusted under 35 U.S.C. 154(b) by 1003 days.

(21) Appl. No.: 11/867,380

(22) Filed: Oct. 4, 2007

(65) Prior Publication Data

US 2008/0100272 A1 May 1, 2008

(30) Foreign Application Priority Data

Oct. 6, 2006 (JP) ................................. 2006-275687

(51) Int. Cl.
*G05F 1/08* (2006.01)
*G05F 1/40* (2006.01)
*G05F 1/44* (2006.01)
(52) U.S. Cl. ........... 323/266; 363/60; 323/274; 323/275
(58) Field of Classification Search .................. 320/118, 320/128, 132, 134; 323/266, 268, 273–281, 323/284; 363/59, 60; 327/536
See application file for complete search history.

(56) References Cited

U.S. PATENT DOCUMENTS

| | | | | |
|---|---|---|---|---|
| 5,695,886 A * | 12/1997 | Dewan et al. | ...................... | 429/7 |
| 5,896,025 A * | 4/1999 | Yamaguchi et al. | .......... | 320/134 |
| 6,014,030 A * | 1/2000 | Smith et al. | .................... | 324/705 |
| 6,438,005 B1 * | 8/2002 | Walter | .............................. | 363/60 |
| 6,456,513 B2 * | 9/2002 | Saito | ................................ | 363/59 |
| 6,522,558 B2 * | 2/2003 | Henry | ............................... | 363/60 |
| 6,707,280 B1 * | 3/2004 | Liu et al. | ........................ | 323/224 |
| 6,850,040 B2 * | 2/2005 | Xiong et al. | ................... | 320/134 |
| 6,888,468 B2 * | 5/2005 | Bertness | ................... | 340/636.15 |
| 6,992,463 B2 * | 1/2006 | Yoshio | .......................... | 320/134 |
| 2004/0135546 A1 * | 7/2004 | Chertok et al. | ............... | 320/118 |
| 2005/0237027 A1 * | 10/2005 | Sasaki et al. | ................... | 320/132 |
| 2006/0255768 A1 * | 11/2006 | Yoshio | .......................... | 320/134 |

* cited by examiner

*Primary Examiner* — Gary L Laxton
*Assistant Examiner* — Nusrat Quddus
(74) *Attorney, Agent, or Firm* — William B. Kempler; Wade J. Brady, III; Frederick J. Telecky, Jr.

(57) ABSTRACT

A power supply circuit with low noise and low power consumption and a battery device using the power supply circuit. If a voltage VDD is higher than a prescribed voltage, a charge pump circuit 140A is operated in "½ mode" (a step-down ratio of "2"), steps down the voltage VDD, and outputs an intermediate voltage VCPO. Since the voltage VDD is stepped down, the intermediate voltage VCPO being input into a first LDO 135 is about half the case where no step-down is carried out, and the power being consumed in a MOS transistor Q11 (FIG. 3) of the first LDO 135 is greatly reduced. Therefore, the increase in power consumption of the first LDO 135 due to a voltage increase in the voltage VDD can be suppressed. Also, since the heat sink of the first LDO 135 can be reduced in size or omitted by the suppression of power consumption, the size and weight of the device can be reduced.

4 Claims, 7 Drawing Sheets

FIG. 5
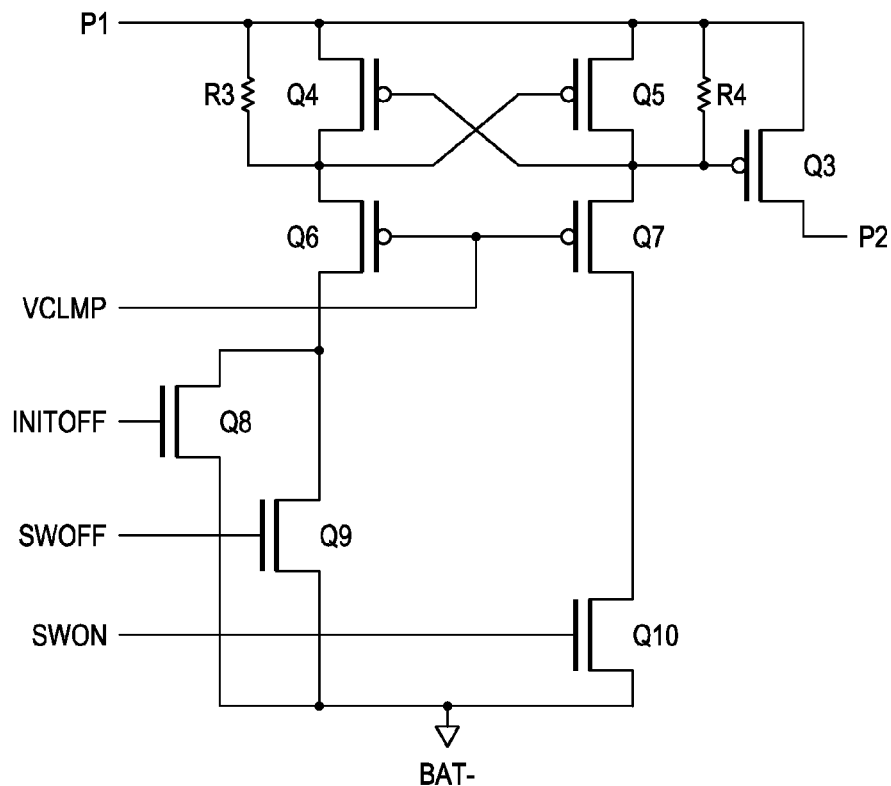
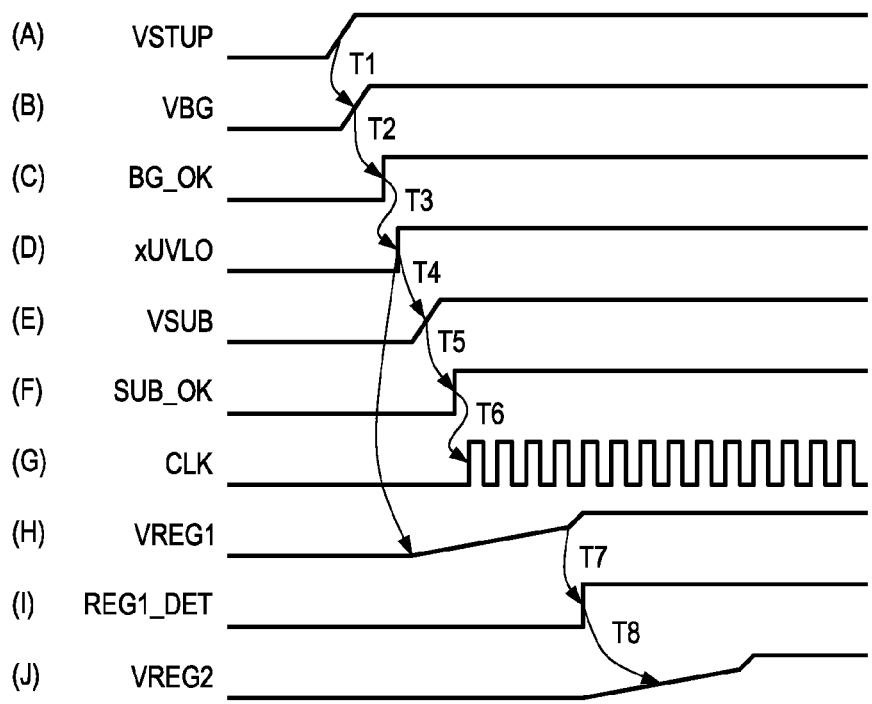
FIG. 6

POWER SUPPLY CIRCUIT AND BATTERY DEVICE

FIELD OF THE INVENTION

The present invention pertains to a power supply circuit that steps down an input voltage and outputs it, and a battery device equipped with a power supply circuit that steps down the voltage of a battery and generates a power supply voltage of an internal circuit, for example, a power supply circuit equipped with a low dropout linear regulator.

BACKGROUND OF THE INVENTION

Recently, in batteries such as lithium ion secondary batteries and nickel-hydrogen secondary batteries, improvement in the energy density has shown marked progress, and batteries have driven equipment for a long time while maintaining miniaturization and lightness. The performance improvement of batteries contributes largely to the supply of portable electronic equipment represented by portable phones.

Also, along with the high performance of the battery body, the performance of peripheral circuits has also advanced. For example, a battery device (also called a battery pack) in which an electric circuit for realizing various functions such as residual amount management function is assembled into the battery body, can be mounted in electronic equipment such as notebook type computers and video cameras in which batteries can be exchanged. Recently, battery devices for realizing these functions using a microcomputer (hereinafter, sometimes called "μC") have been typical.

On the other hand, for example, in high-performance batteries such as lithium ion secondary batteries, if the cell voltage is abnormally raised by an overcharge, or the cell voltage is extremely lowered by an overdischarge, or if excessive charge and discharge current flows in cells, a degradation in characteristics and problems are apt to be structurally caused. For this reason, a circuit for protecting batteries by cutting off the power supply path between the batteries and electronic equipment, if an abnormal charge and discharge is caused, is mounted in typical battery devices. In Japanese Kokai Patent Application No. 2005-160169, a technique pertaining to mounting a battery protecting circuit in a battery device is described.

On the other hand, in this battery device, in order to operate a built-in microcomputer and battery protecting circuit, a power supply circuit that steps up and down the voltage of the battery and generates a power supply voltage at a fixed level is installed.

For example, in equipment such as portable phones in which the voltage of the battery is relatively low and the power capacity is also small, a switching regulator is sometime employed as a power supply circuit. However, in equipment using a high-capacity and high-voltage battery, since noise being generated by a switching regulator is likely to influence the operation of the equipment, it is typical to use a low dropout type linear regulator (hereinafter, sometimes abbreviated to LDO) with low noise.

On the other hand, if the number of cells connected in series increases, the capacity of the battery can be raised accordingly, but since the loss generated in the above-mentioned LDO is increased, the increase in the number of cells is disadvantageous in terms of low power consumption. Also, if devices such as light-emitting diodes and flash memories that require a relatively large current consumption are present, a radiation for the LDO is sometimes required, and for this purpose, if a radiation means such as radiating plate and heat sink is installed, it is disadvantageous in terms of miniaturization and high densification of the equipment.

A general object of the present invention is to provide a power supply circuit with low noise and small power consumption and a battery device using the power supply circuit.

SUMMARY OF THE INVENTION

The power supply circuit in a first aspect of the present invention is equipped with a charge pump circuit for outputting an intermediate voltage in which an input voltage has been stepped down, a voltage regulator circuit that includes an active element circuit connected between an output terminal of the above-mentioned intermediate voltage of the above-mentioned charge pump circuit and an output terminal of the above-mentioned power supply voltage and a feedback control circuit for feedback-controlling the above-mentioned active element circuit so that the above-mentioned power supply voltage approaches a predetermined voltage, a voltage detecting circuit for detecting said input voltage or the voltage being applied to the above-mentioned active element circuit, and a control circuit that switches the operating mode of the above-mentioned charge pump circuit so that the step-down ratio is increased if the voltage being detected in the above-mentioned voltage detecting circuit exceeds a predetermined voltage threshold.

According to the above-mentioned power supply circuit, the above-mentioned input voltage or the voltage being applied to the above-mentioned active element circuit is detected in the above-mentioned voltage detecting circuit, and said detected voltage and a predetermined voltage threshold are compared. If said detected voltage exceeds the predetermined voltage threshold, the operating mode is switched by the control of the above-mentioned control circuit so that the step-down ratio of the above-mentioned charge pump circuit is increased. If the step-down ratio of the above-mentioned charge pump is increased, since the above-mentioned intermediate voltage is lowered, the voltage being applied to the above-mentioned active element circuit is lowered, and the power consumption of the above-mentioned active element circuit is reduced.

Appropriately, the above-mentioned power supply circuit may have a current detecting circuit for detecting a current in the above-mentioned active element circuit in this case, the above-mentioned control circuit may set the operating mode of the above-mentioned charge pump circuit so that the above-mentioned input voltage is stepped down if the voltage being detected in the above-mentioned voltage detecting circuit is higher than the predetermined voltage threshold and the current being detected in the above-mentioned current detecting circuit is higher than a predetermined current threshold, and may set the operating mode of the above-mentioned charge pump circuit so that the above-mentioned input voltage is output as the above-mentioned intermediate voltage without being stepped down if the voltage being detected in the above-mentioned voltage detecting circuit is lower than the predetermined voltage threshold or the current being detected in the above-mentioned current detecting circuit is lower than the predetermined current threshold.

According to the above-mentioned constitution, if the voltage being detected in the above-mentioned voltage detecting circuit is higher than the predetermined voltage threshold and the current being detected in the above-mentioned current detecting circuit is higher than the predetermined current threshold, since the above-mentioned intermediate voltage in which the above-mentioned input voltage has been stepped down is output from the above-mentioned charge pump circuit, the power consumption of the above-mentioned active element circuit is reduced compared with the case where the step-down is not carried out. On the other hand, if the voltage being detected in the above-mentioned voltage detecting circuit is lower than the above-mentioned predetermined voltage threshold or the current being detected in the above-mentioned current detecting circuit is lower than the predetermined current threshold, since the step-down operation of the above-mentioned charge pump circuit stops, power consumption due to the step-down operation of the above-mentioned charge pump circuit is cut down.

Appropriately, the above-mentioned charge pump circuit may have several operating modes with different step-down ratios in this case, the above-mentioned control circuit may judge whether or not the voltage being detected in the above-mentioned voltage detecting circuit is included in any of several predetermined voltage ranges and switch the operating mode of the above-mentioned charge pump circuit in accordance with said judgment result so that the above-mentioned charge pump circuit is operated at a large step-down ratio if the voltage range of said judgment result is a high potential.

According to the above-mentioned constitution, if the voltage ratio of the above-mentioned judgment result is a high potential, the above-mentioned charge pump circuit carries out a step-down operation in the operating mode with a large step-down ratio. Thus, even if the above-mentioned input voltage rises, since a rise in the above-mentioned intermediate voltage is suppressed by the increase in the step-down ratio of the above-mentioned charge pump circuit, an increase in the power consumption of the above-mentioned active element is suppressed.

Appropriately, the above-mentioned power supply circuit may have a power detecting circuit for detecting the power being consumed in the above-mentioned active element circuit, and the above-mentioned charge pump circuit may have several operating modes with different step-down ratios. In this case, the above-mentioned control circuit may judge whether or not the above-mentioned voltage being detected in the above-mentioned voltage detecting circuit is included in any of several predetermined voltage ranges and switch the operating mode of the above-mentioned charge pump circuit so that it is operated at a step-down ratio in which the allowable upper limit for a voltage range of said judgment result is not exceeded and a step-down ratio in which the above-mentioned power consumption being detected is smaller than a predetermined power threshold, if the power consumption being detected in the above-mentioned power detecting circuit is larger than the predetermined power threshold.

According to the above-mentioned constitution, whether or not the above-mentioned input voltage being detected in the above-mentioned voltage detecting circuit is included in any of several predetermined voltage ranges is judged. Then, if the power consumption being detected in the above-mentioned power detecting circuit is larger than a predetermined threshold, the operating mode of the above-mentioned charge pump circuit is switched so that the step-down ratio of the above-mentioned charge pump circuit is such that an allowable upper limit for the voltage range of said judgment result is not exceeded and the above-mentioned power consumption is smaller than a predetermined power threshold. Thus, even if the above-mentioned input voltage is changed in any way, since the above-mentioned power consumption is smaller than the above-mentioned predetermined power threshold through switching of the operating mode of the above-mentioned charge pump circuit, an increase in power consumption is suppressed.

Also, in the above-mentioned constitution, if the above-mentioned input voltage being detected in the above-mentioned voltage detecting circuit is lower than the predetermined voltage threshold or the power consumption being detected in the above-mentioned power detecting circuit is smaller than the predetermined power threshold, the above-mentioned control circuit may set the operating mode of the above-mentioned charge pump circuit so that the above-mentioned input voltage is output without being stepped down. Thus, if the step-down operation of the above-mentioned charge pump circuit is stopped, the power consumption due to the step-down operation is lowered.

The battery device in a second aspect of the present invention is equipped with a battery, a switching circuit installed in a power supply path, a battery protecting circuit for controlling on/off of the above-mentioned switching circuit in accordance with a control signal being input, and a power supply circuit that steps down the voltage of the above-mentioned battery and supplies the stepped-down voltage as a power supply voltage to the above-mentioned battery protecting circuit.

The above-mentioned power supply circuit has a charge pump circuit for outputting an intermediate voltage in which the voltage of the above-mentioned battery has been stepped down, a voltage regulator circuit that includes an active element circuit connected between an output terminal of the above-mentioned intermediate voltage of the above-mentioned charge pump circuit and an output terminal of the above-mentioned power supply voltage and a feedback control circuit for feedback-controlling the above-mentioned active element circuit so that the above-mentioned power supply voltage approaches a predetermined voltage, a voltage detecting circuit for detecting the voltage of the above-mentioned battery or the voltage being applied to the above-mentioned active element circuit, and a control circuit that switches the operating mode of the above-mentioned charge pump circuit so that the step-down ratio is increased if the voltage being detected in the above-mentioned voltage detecting circuit exceeds a predetermined voltage threshold.

BRIEF DESCRIPTION OF THE DRAWINGS

FIG. 5 shows an example of the constitution of a switching circuit being used in the charge pump circuit.

FIG. 6 shows a timing example of each signal of the power supply circuit at a time of starting.

REFERENCE NUMERALS AND SYMBOLS AS SHOWN IN THE DRAWINGS

In the Figures 100 represents a battery device, 200 represents electronic equipment, Q1, Q2, Q11 represent p-type MOS transistors, B1 represents a battery, D1, D2 represent diodes, 110 represents an analog front end part (AFE part), 160 represents a microcomputer, 111, 112 represent driving circuits, 113 represents a setup circuit, 114 represents a reference voltage generating circuit, 115 represents a low-voltage operation lock circuit, 116 represents a power supply circuit, 117 represents a selecting circuit, 118 represents a voltage amplifying circuit, 119 represents a current amplifying circuit, 120 represents an overcurrent/short circuit detecting circuit, 121 represents a current bypass circuit, 122 represents a control circuit, 130 represents a sub power supply circuit, 131 represents a sub power supply start detecting circuit, 132 represents an oscillating circuit, 133 represents a watchdog timer (WDT) circuit, 134 represents a charge pump part, 135 represents a first LDO, 136 represents a current detecting signal generating circuit, 137 represents a first LDO start detecting circuit, 138 represents a second LDO, 140A, 140A represent charge pump circuits, 141, 143, 143A represent charge pump control circuits, 141, 142, 144, 145, 148 represent comparison circuits, 149 represents a differential amplifying circuit, 150 represents a multiplying circuit, 151 represents an error amplifying circuit, R1-R7, R11-R13 represent resistors, SW1-SW5, SW11-SW18 represent switching circuits, C1-C3, C11-C14 represent capacitors.

DESCRIPTION OF THE EMBODIMENTS

According to the present invention, compared with the case where a switching regulator is employed, noise can be reduced, and an increase in power consumption due to an increase in the input voltage can be suppressed.

Next, an embodiment of the present invention will be explained referring to the figures.

Figure 1:
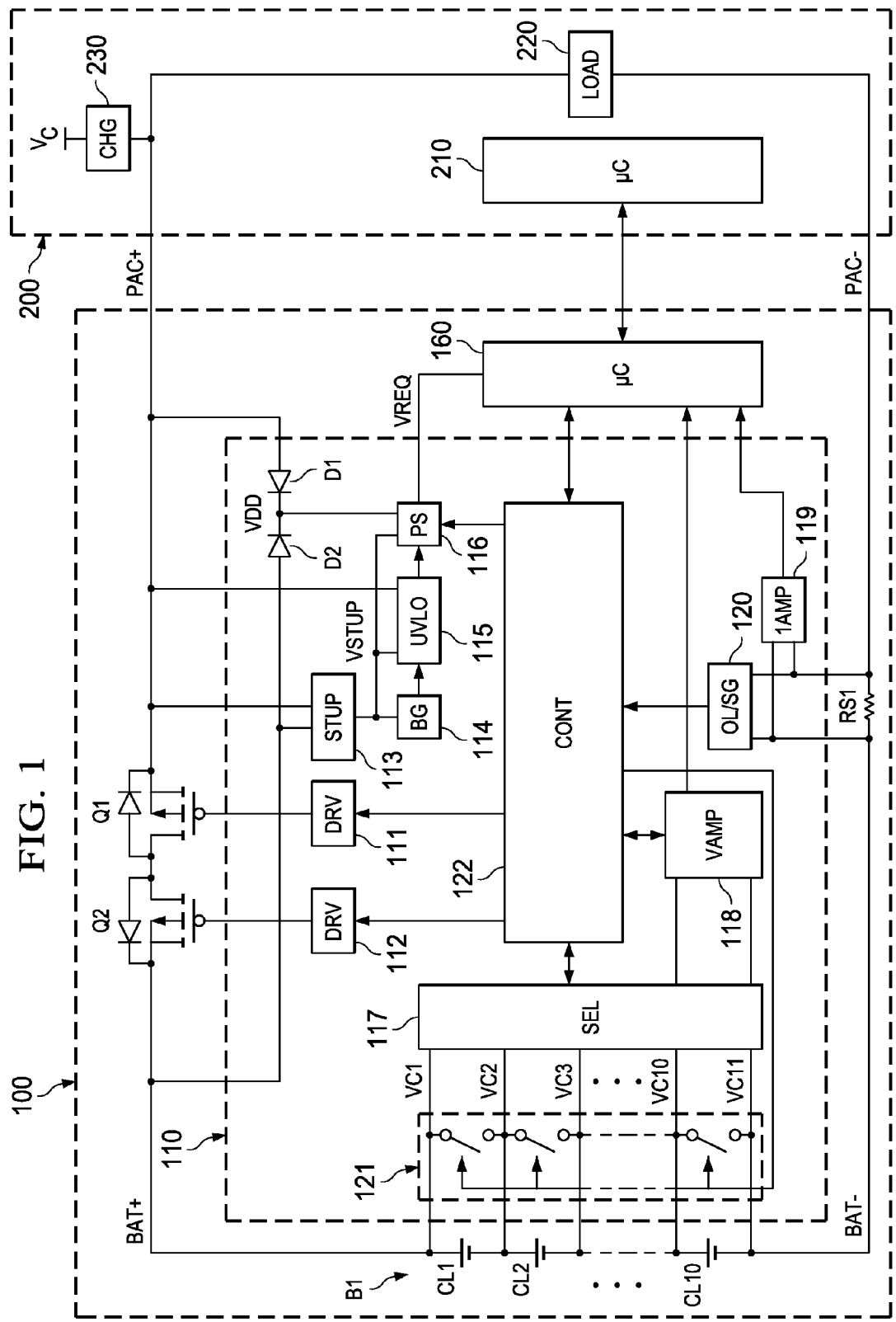
FIG. 1 is a constitutional example of the battery device of an embodiment of the present invention.

FIG. 1 is a constitutional example of the battery device of an embodiment of the present invention. A battery device 100 shown in FIG. 1 has P type MOS transistors Q1 and Q2, battery B1, resistor Rs1 for current detection, analog front end part (AFE part) 110, and microcomputer 160.

AFE part 110 includes diodes D1 and D2, driving circuits 111 and 112 of MOS transistors Q1 and Q2, setup circuit 113, reference voltage generating circuit 114, low-voltage operation lock circuit 115, power supply circuit 116, selecting circuit 117, voltage amplifying circuit 118, current amplifying circuit 119, overcurrent/short circuit detecting circuit 120, current bypass circuit 121, and control circuit 122.

The power supply circuit 116 is an example of the power supply circuit of the present invention the battery device 100 is an example of the battery device of the present invention. The battery B1 is an example of the battery of the present invention. The MOS transistors Q1 and Q2 are examples of the switching circuit of the present invention. The AFE part 110 is an example of the battery protecting circuit of the present invention.

The battery B1 is constituted by connecting several storage devices such as lithium ion secondary batteries in series. In the example of FIG. 1, 10 storage devices CL1-CL10 are connected in series between a positive electrode BAT+ and a negative electrode BAT of the battery B1. Also, the storage device, for example, may be one battery cell or may also be several battery cells connected in series or in parallel.

The drains of the MOS transistor Q1 and Q2 are commonly connected to each other, the source of the MOS transistor Q1 is connected to the positive electrode PAC+ of the battery device 100, and the source of the MOS transistor Q2 is connected to the positive electrode BAT+ of the battery B1. The gates of the MOS transistors Q1 and Q2 are respectively driven by the driving circuits 111 and 112 of the AFE part 110.

Between the negative electrode BAT− of the battery B1 and the negative electrode PAC− of the battery device 100, the resistor Rs1 for current detection is connected. The AFE part 110 generates a power supply voltage VREG based on the voltage being supplied from the battery B1 or the voltage being supplied through the positive electrodes PAC+ and PAC− from the electronic equipment 200 of a host to microcomputer 160.

If the microcomputer 160 is started, the AFE part 110 communicates with the microcomputer 160 via a prescribed interface and stores set values being transmitted from the microcomputer 160 in an internal register. Then, according to the set values stored in the register, on/off of the MOS transistors Q1 and Q2 is controlled, and the voltage of each battery cell (CEL1-CEL10) is detected.

For example, the AFE part 110 stores the voltage of each battery cell (CEL1-CEL10) according to set values from the microcomputer 160 and outputs them to the microcomputer 160. Then, each charge and discharge current is controlled according to the set values from the microcomputer 160 for monitoring the voltage so that the voltage of each battery cell (CEL1-CEL10) is identical.

Also, the AFE part 110 amplifies the voltage being generated across the resistor Rs1 and outputs it as a current detecting signal of the battery B1 to the microcomputer 160. The voltage of each battery cell and the current detecting signal of the battery B1 being from MFG part 110 output to the microcomputer 160 are used in a process for detecting a full charge state of the battery B1 when charging and in a process for detecting the remaining amount of battery B1 when discharging. Also, the AFE part 110 monitors the charge and discharge current of the battery B1 based on the voltage being generated in the resistor Rs1, and if an overcurrent or short circuit is detected, the battery B1 is protected by cutting off the MOS transistors Q1 and Q2.

The microcomputer 160 monitors the charge and discharge current of the battery B1 and the voltage of each cell and carries out a process for equalizing the voltage of each battery cell, a process for predicting the full charge state and the remaining battery power, etc., of the battery B1, and a process for setting a detection threshold of an overcurrent/short circuit current in the AFE part 110, etc.

In other words, the microcomputer 160 has an analog-digital converting circuit, converts analog detecting signals being output from the voltage amplifying circuit 118 and the current amplifying circuit 119 into digital detecting signals, and processes them. Also, the microcomputer communicates with the control circuit 122 via a prescribed interface and controls switching of the selecting circuit 117 and on/off of the MOS transistors Q1 and Q2. Also, the microcomputer 160 communicates with the electronic equipment 200 by an interface between chips such as SMBUS and provides information such as the remaining battery power of the battery device 100 to the electronic equipment 200.

The battery device 100 is used by being connected to the electronic equipment 200 such as a personal computer. The electronic equipment 200, for example, as shown in FIG. 1, comprises microcomputer 210, load 220, and charge circuit 230.

The microcomputer 210 communicates with the microcomputer 160 of the battery device 100 through an interface such as SMBUS and obtains information such as the remaining battery power. Also, the microcomputer controls the charge circuit 230 based on information obtained from the battery device 100 and sets the charge current of the battery B1 to an appropriate value.

The load 220 shows an internal load of the electronic equipment 200 being operated by the power supply from the battery device 100. The charge circuit 220 generates a charge current for charging the battery device 100.

Next, a detailed constitution of the AFE part 110 will be explained.

The cathodes of the diodes D1 and D2 are commonly connected to each other, the anode of the diode D1 is connected to the positive electrode PAC+ of the battery device 100, and the anode of the diode D2 is connected to the positive electrode BAT+ of the battery B1. A voltage VDD being generated in the commonly connected cathodes of the diodes D1 and D2 is supplied to the power supply device 116 that will be mentioned later.

The driving circuit 111 drives the gate of the MOS transistor Q1 in accordance with a control signal being output from the control circuit 122. In other words, if the MOS transistor Q1 is turned on, its gate potential is set to be lower than the source potential (potential of the positive electrode BAT+), and a threshold or higher voltage is applied between the gate and the source of the MOS transistor Q1. If the MOS transistor Q1 is turned off, the gate potential is raised to the source potential, and the voltage between the gate and the source of the MOS transistor Q1 is set to be lower than the threshold.

The driving circuit 111 drives the gate of the MOS transistor Q2 in accordance with a control signal being output from the control circuit 122. In other words, if the MOS transistor Q2 is turned on, its gate potential is set to be lower than the source potential (potential of the positive electrode PAC+), and a threshold or higher voltage is applied between the gate and the source of the MOS transistor Q2. If the MOS transistor Q2 is turned off, the gate potential is raised to the source potential, and the voltage between the gate and the source of the MOS transistor Q2 is set to be lower than the threshold.

The setup circuit 113 generates a start-up voltage VSTUP required for starting the AFE part 110 based on the voltage of the battery B1 being generated AT the positive electrode BAT+ or the voltage from the electronic equipment 200 being supplied to the positive electrode PAC+.

The reference voltage generating circuit 114, for example, is a circuit for generating a fixed reference voltage VBG by a band gap circuit, etc., and is operated by receiving the start-up voltage VSTUP being supplied from the setup circuit 113. If the reference voltage VBG rises to a fixed level, a signal BG_OK is output, and a start completion of the reference voltage generating circuit 114 is notified.

If the start completion of the reference voltage generating circuit 114 is notified by the signal BG-OK, the low-voltage operation lock circuit 115 generates a control signal xUVLO showing whether or not the voltage of the positive electrode PAC+ has reached a prescribed voltage. For example, the start-up voltage VSTUP is monitored, and whether or not the voltage of the positive electrode PAC+ has reached a prescribed voltage is indirectly judged from the voltage level. If the voltage of the positive electrode PAC+ is lower than the prescribed voltage, the power supply circuit 116 stops the supply of the power supply voltage VREG in accordance with the control signal xUVLO and starts it if the voltage of the positive PAC+ exceeds the prescribed voltage. As an example, if the voltage of the positive electrode PAC+ is lower than the prescribed voltage, control signal xUVLO at low level is generated, and if the voltage is higher than the prescribed voltage, control signal xUVLO at high level is generated.

The low-voltage operation lock circuit 115 is operated by receiving the above-mentioned start-up voltage VSTUP being supplied from the setup circuit 113.

The power supply circuit 116 generates a power supply voltage VREG that is supplied to each circuit in the AFE part 110 and the microcomputer 160. The power supply circuit 116, for example, includes a linear regulator with a low dropout, inputs the voltage being supplied via the diode D1 from the positive electrode PAC+ of the battery device 100 or the voltage being supplied via the diode D2 from the positive electrode BAT+ of the battery B1, steps down the input voltage, and generates the power supply voltage VREG with a fixed value. Some of the circuits included in the power supply circuit 116 are started by receiving the start-up voltage VSTUP being supplied from the setup circuit 113.

A detailed constitution of the power supply circuit 116 will be explained later referring to FIGS. 2-8.

The selecting circuit 117 selects one storage device from the storage devices CL1-CL10 connected in series and outputs its voltage. The voltage amplifying circuit 118 converts the voltage of the storage device selected in the selecting circuit 117 into a voltage based on a prescribed ground level and outputs it to the microcomputer 160.

The current amplifying circuit 119 amplifies the voltage being generated in the resistor Rs1 and outputs it as a detecting signal of the charge and discharge current flowing in the battery B1 to the microcomputer 160. The overcurrent/short circuit detecting circuit 120 detects the generation of an overcurrent or short circuit in the battery B1 in accordance with whether the voltage being generated across the resistor Rs1 exceeds a prescribed threshold for a prescribed time or longer and outputs the detection result to the control circuit 122.

The current bypass circuit 121 bypasses the current flowing in each of the storage devices CL1-CL10 in accordance a the control signal being input from the control circuit 122. The current bypass circuit 121, for example, as shown in FIG. 1, has 10 switches connected in parallel with the storage devices CL1-CL10. In each switch, an internal resistor is included, and if a switch is turned on in accordance with a control signal of the control circuit 122, the charge and discharge current of the storage device is bypassed without short-circuiting the storage devices connected in parallel.

The control circuit 122 is a circuit being operated by receiving the supply of the power supply voltage VREG and outputs a control signal for controlling each circuit in the AFE part 110. In other words, the control circuit 122 communicates with the microcomputer 160 via a prescribed interface and stores set values being sent from the microcomputer 160 in an internal register. Then, the control circuit controls each circuit in the AFE part 110 in accordance with the set values of the register.

For example, in accordance with set values being stored in the register, the selection of the storage device detected in the selecting circuit 117, the current bypass of each storage device in the current bypass circuit 121, the on/off control of the MOS transistors Q1 and Q2 corresponding to the detection result of the overcurrent/short circuit detecting circuit 119, the setup of the overcurrent detection threshold in the overcurrent/short circuit detecting circuit 119, etc., are carried out.

Next, the power supply circuit 116 of the embodiment of the present invention will be explained in detail.

Figure 2:
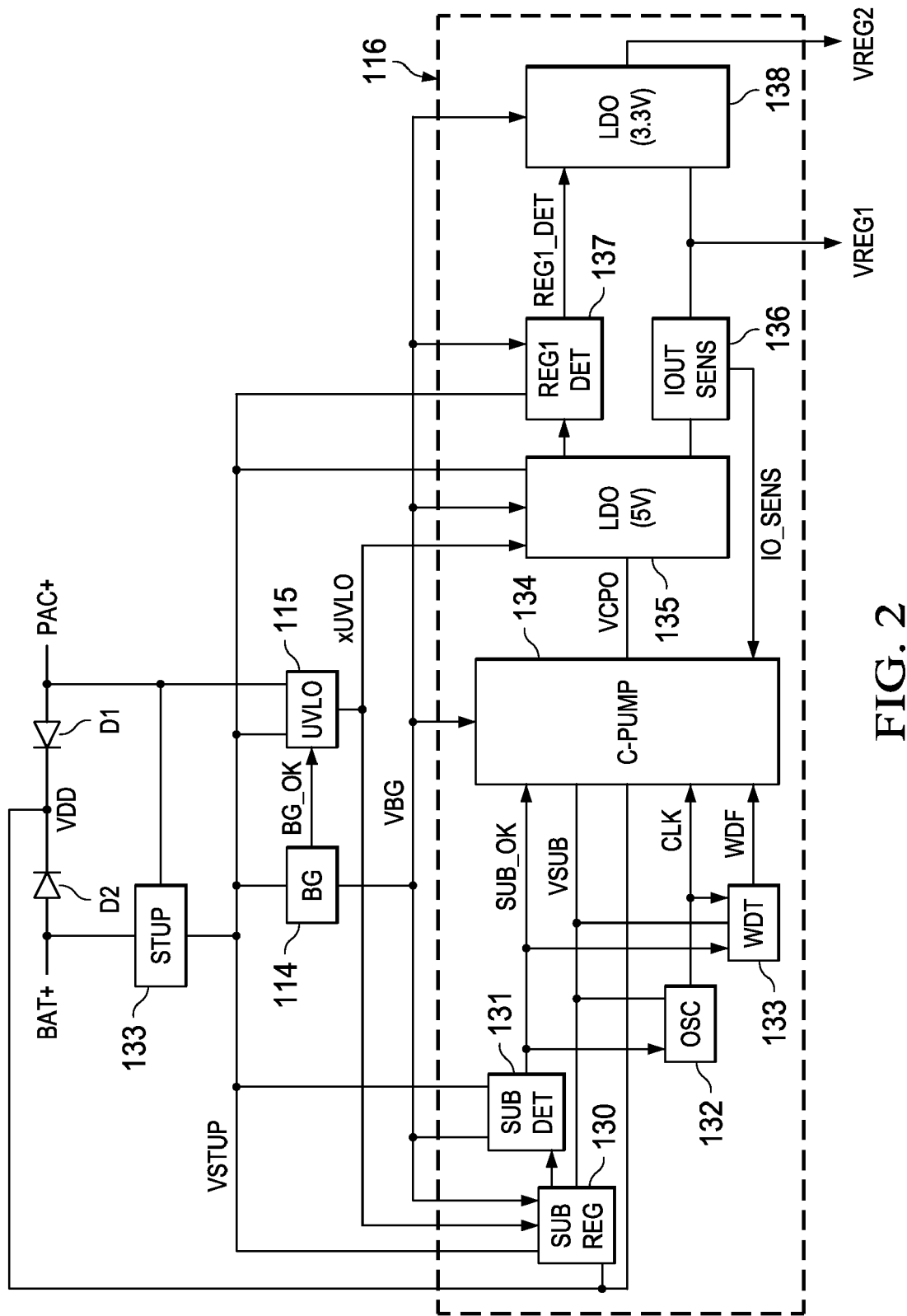
FIG. 2 shows an example of the constitution of the power supply circuit of the embodiment of the present invention.

FIG. 2 shows an example of the constitution of the power supply circuit 116 of the embodiment of the present invention. The power supply circuit 116 shown in FIG. 2 has sub power supply circuit 130, sub power start detecting circuit 131, oscillating circuit 132, watchdog timer (WDT) circuit 133, charge pump part 134, first LDO 135, current detecting signal generating circuit 136, first LDO start detecting circuit 137, and second LDO 138.

The first LDO circuit 135 is an example of the voltage regulator circuit of the present invention. If the control signal xUVLO being output from the low-voltage operation lock circuit 115 is changed from low level to high level (that is, if the positive electrode PAC+ is higher than a prescribed voltage), the sub power supply circuit 130 is started by receiving the start-up voltage VSTUP being supplied from the setup circuit 113 and generates a sub power supply voltage VSUB in which the voltage VDD has been stepped down. The sub power supply circuit 130 controls the sub power supply voltage VSUB at a fixed voltage (for example, 3.3 V) based on the reference voltage VBG.

The sub power supply start detecting circuit 131 decides whether or not the power supply voltage VSUB is higher than the prescribed voltage (that is, whether or not the sub power supply start detecting circuit 131 is in a start state) based on the reference voltage VBG and generates a control signal SUB_OK showing the judgment result. Here, as an example, if the power supply voltage VSUB is higher than the prescribed voltage, a high-level control signal SUB_OK is generated, and if the power supply voltage is lower than the prescribed voltage, a low-level control signal is generated.

The sub power supply start detecting circuit 131 is operated by receiving the start-up voltage VSTUP being supplied from the setup circuit 113. If the control signal SUB_OK is changed from low level to high level (that is, if start of the sub power supply start detecting circuit 131 is detected), the oscillating circuit 131 generates a clock signal CLK.

The oscillating circuit 131 is operated by receiving the power supply voltage VSUB being supplied from the sub power supply circuit 130. The WDT circuit 133 monitors the clock signal CLK being generated in the oscillating circuit 131 and generates a signal WDF showing whether or not an abnormal state has been generated in which a clock signal is not generated for a fixed period or longer. The WDT circuit 133 is a circuit that is operated by receiving the power supply voltage VSUB being supplied from the sub power supply circuit 130, and if the control signal SUB_OK is changed from low level to high level (if start of the sub power supply start detecting circuit 131 is detected), monitoring of clock signal CLK will start.

The charge pump part 134 steps down the voltage VDD being generated in the commonly connected cathodes of the diodes D1 and D2 and outputs the stepped-down voltage as an intermediate voltage VCPO. If the control signal SUB_OK is changed from low level to high level (if start of the sub power supply start detecting circuit 131 is detected), the charge pump part 134 starts a charge pump operation by synchronizing with the clock signal CLK. Also, if the generation of an abnormal state is notified by the signal WDF of the WDT circuit 133, the charge pump operation is stopped.

The charge pump part 134 has operating modes with different step-down ratios (input voltage/output voltage) and switches the operating mode in accordance with the voltage VDD. In other words, if the voltage VDD is higher than the prescribed voltage, the operating mode is switched so that the step-down ratio is increased. The detailed constitution and operation of the charge pump part 134 will be explained later referring to FIGS. 4-9.

The first LDO 135 steps down the intermediate voltage VCPO being output from the charge pump part 134 and outputs a power supply voltage VREG1 controlled at a fixed level (for example, 5V).

Figure 3:
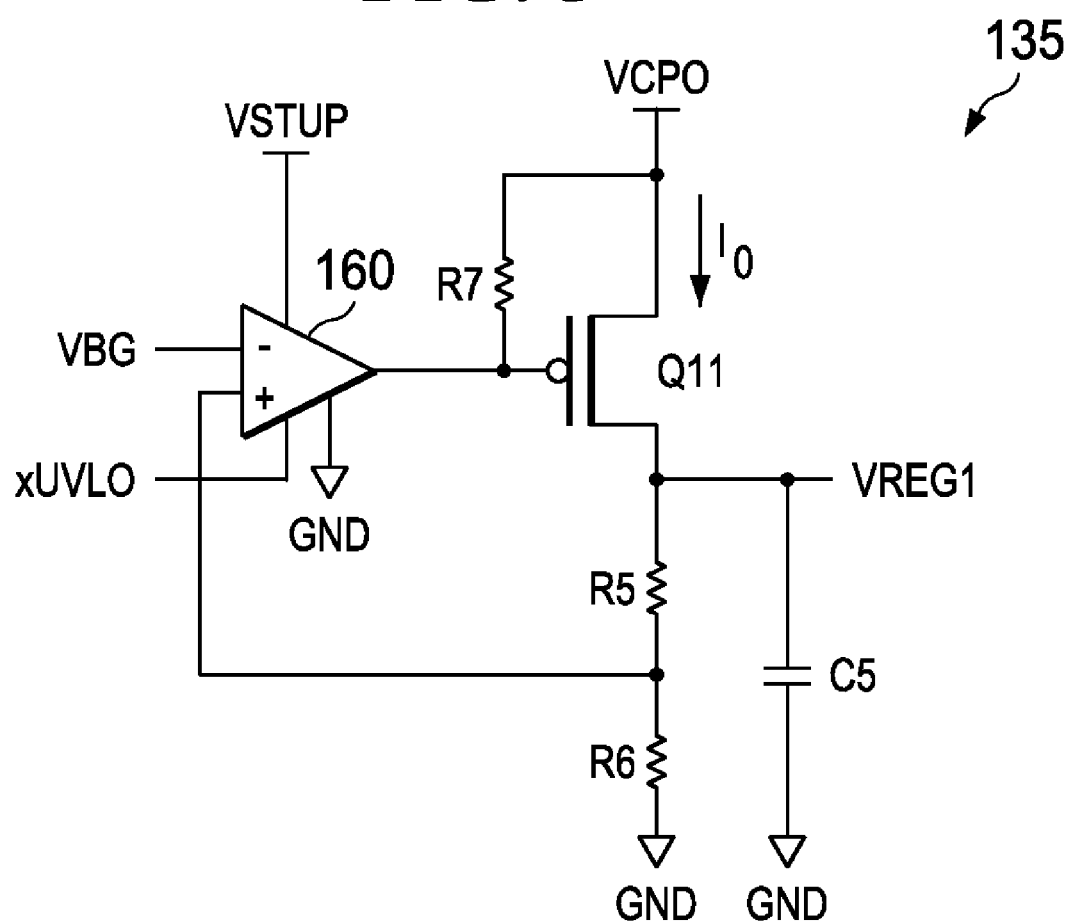
FIG. 3 shows an example of the constitution of an LDO being installed at the rear stage of a charge pump circuit.

FIG. 3 shows an example of the constitution of the first LDO 135.

The first LDO 135 shown in FIG. 3 has p-type MOS transistor Q11, resistors R5-R7, capacitor C5, and error amplifying circuit 151. The MOS transistor Q11 is an example of the active element circuit of the present invention. The circuit block including the resistors R5-R7 and the error amplifying circuit 151 are an example of the feedback control circuit of the present invention. The source of the MOS transistor Q11 inputs the intermediate voltage VCPO, its drain outputs the power supply voltage VREG1, and the resistor R7 is connected between the source and the gate. The resistors R5-R6 are connected between the output terminal of the power supply voltage VREG1 and the ground level GND and generate a voltage in which the power supply voltage VREG1 is divided at the middle point of the connection. The capacitor C5 is connected between the output terminal of the power supply voltage VREG1 and the ground level GND.

The error amplifying circuit 160 inputs the power supply voltage VREG1 divided by the resistors R5 and R6 into a positive input terminal, inputs the reference VBG into a negative input terminal, and drives the gate of the MOS transistor Q11 in accordance with the differential voltage in which the voltage of the negative input terminal is subtracted from the voltage of the positive input terminal. In other words, if the voltage of the positive input terminal is higher than the voltage of the negative input terminal, the gate voltage of the MOS transistor Q11 is increased, and if the voltage of the positive input terminal is lower than the voltage of the negative input terminal, the gate voltage of the MOS transistor Q11 is decreased.

The error amplifying circuit 160 is operated by receiving the start-up voltage VSTUP being supplied from the setup circuit 113, and if the control signal xUVLO of the low-voltage operation lock circuit 115 is at low level (that is, if the voltage of the positive electrode PAC+ is lower than a prescribed voltage), the error amplifying circuit sets the output in a high-impedance state and turns off the MOS transistor Q11.

According to the first LDO 135 shown in FIG. 3, the error amplifying circuit 160 is set in an operable state by receiving the start-up voltage VSTUP being supplied from the setup circuit 113 and starts an amplifying operation by change of the control signal xUVLO from low level to high level.

If the power supply voltage VREG1 divided by the resistors R5 and R6 is lower than the reference voltage VBG, since the gate voltage of the MOS transistor Q11 is lowered by driving of the error amplifying circuit 160, the current of the MOS transistor Q11 is increased, and the power supply voltage VREG1 is raised. On the other hand, if the power supply voltage VREG1 divided by the resistors R5 and R6 is higher than the reference voltage VBG, since the gate voltage of the MOS transistor Q11 is raised by driving of the error amplifying circuit 160, the current of the MOS transistor Q11 is decreased, and the power supply voltage VREG1 is lowered. With this feedback control, the power supply voltage VREG1 is controlled at a fixed voltage.

FIG. 2 will be explained below.

The current detecting signal generating circuit 136 generates a current detecting signal IO_SENS corresponding to the current flowing in the MOS transistor Q11 of the first LDO 135. For example, similarly to the MOS transistor Q11, using a p-type MOS transistor for a current monitor that inputs the output signal of the error amplifying circuit 160 and generates a current flowing from the intermediate voltage VCPO to the ground level GND, a current for monitoring having a proportional relation with the current flowing in the MOS transistor Q11 may also be generated. Or a fine resistor can be inserted between the source of the MOS transistor Q11 and the voltage dividing circuit of the resistors R5 and R6, and the voltage being generated by the fine resistor is amplified, so that the current detecting signal IO_SENS may also be generated.

The first LDO start detecting circuit 137 decides whether or not the power supply voltage VREG1 is higher than the prescribed voltage (that is, whether or not the first LDO 135 is in a start state) based on the reference voltage VBG and generates a control signal REG1_DET showing the judgment result. Here, as an example, if the power supply voltage VREG1 is higher than the prescribed voltage, a high-level control signal REG1_DET is generated, and if the power supply voltage is lower than the prescribed voltage, a low-level control signal is generated.

The first LDO start detecting circuit 137 is operated by receiving the start-up voltage VSTUP being supplied from the setup circuit 113. The second LDO 138 further steps down the power supply voltage VREG1 being output from the charge pump part 134 and outputs a power supply voltage VREG2 controlled at a fixed level (for example, 3.3 V). If the control signal REG1_DET is changed from low level to high level (that is, if the start of the first LDO 135 is detected), the second LDO 138 starts the output of the power supply voltage VREG2.

Next, a detailed constitution of the charge pump part 134 will be explained referring to FIG. 4.

Figure 4:
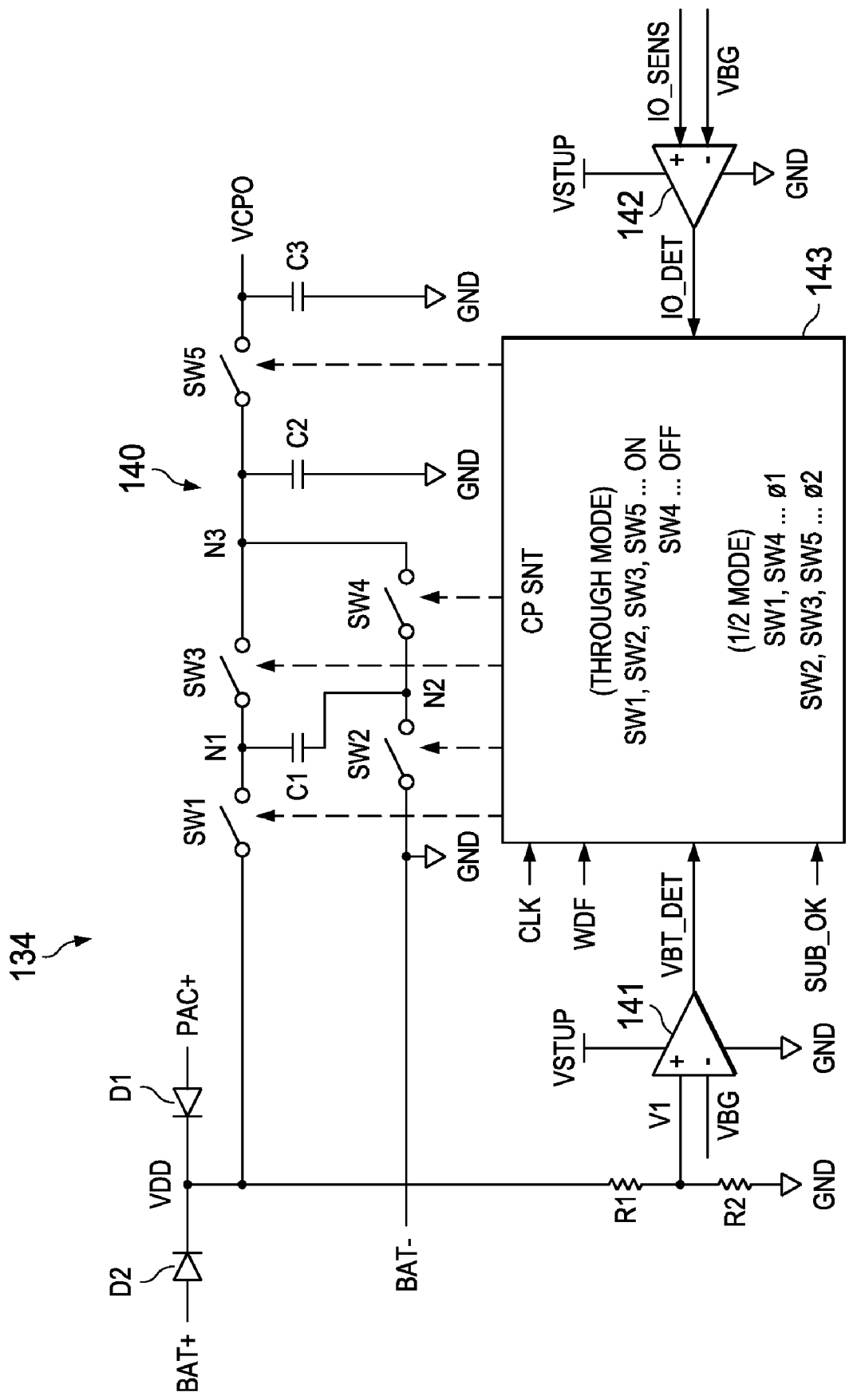
FIG. 4 shows an example of the constitution of the charge pump circuit.

FIG. 4 shows an example of the constitution of the charge pump part 134. The charge pump part 134 shown in FIG. 4 has charge pump circuit 140A, charge pump control circuit 141, comparison circuits 141 and 142, and resistors R1 and R2. The charge pump circuit 140A has switching circuits SW1-SW5 and capacitors C1-C3. The charge pump circuit 140A is an example of the charge pump circuit of the present invention. The charge pump control circuit 141 is an example of the control circuit of the present invention. The circuit block including the resistors R1 and R2 and the comparison circuit 141 is an example of the voltage detecting circuit of the present invention.

The circuit block including the current detecting signal generating circuit 136 (FIG. 3) and the comparison circuit 142 is an example of the current detecting circuit of the present invention.

The charge pump circuit 140A carries out a charge pump operation according to control of the charge pump control circuit 141, steps down the voltage VDD of the cathodes of the diodes D1 and D2 (FIG. 1) to about ½, and outputs the stepped-down voltage as the intermediate voltage VCPO. Hereinafter, this operating mode is called the "½ mode."

On the other hand, the charge pump circuit 140A can stop a step-down operation according to control of the charge pump control circuit 141. In this case, the voltage VDD is output as is as the intermediate voltage VCPO without stepping down that is, the step-down ratio is "1". Hereinafter, this operating mode is called the "through mode."

The switching circuit SW1 is connected between the cathodes of the diodes D1 and D2 and a node N2. The switching circuit SW2 is connected between the negative electrode BAT− of the battery B1 and a node N1. The switching circuit SW3 is connected between the node N1 and a node N3. The switching circuit SW4 is connected between the node N2 and the node N3. The switching circuit SW5 is connected between the node N3 and the output terminal of the intermediate voltage VCPO. The capacitor C1 is connected between the node N1 and the node N2. The capacitor C2 is connected between the node N3 and ground level GND.

The capacitor C3 is connected between the output terminal of the intermediate voltage VCPO and the ground level GND. In the example of FIG. 4, the ground level GND has the same potential as that of the negative electrode BAT− of the battery B1.

FIG. 5 is an example of the constitution of the switching circuits SW1-SW5 (each switching circuit is sometimes written "SWn").

The switching circuit SWn shown in FIG. 5 has p-type MOS transistors Q3-Q7, n-type MOS transistors Q8-Q10, and resistors R3 and R4.

The source of the MOS transistors Q4 and Q5 is connected to one terminal P1 of the switch circuit SWn. The drain of the MOS transistor Q4 is connected to the ground level GND (negative electrode BAT−) via the MOS transistors Q6 and Q9. The drain of the MOS transistor Q5 is connected to the ground level GND (negative electrode BAT−) via the MOS transistors Q7 and Q10. The gate of the MOS transistor Q4 is connected to the drain of the MOS transistor Q5, and the gate of the MOS transistor Q5 is connected to the drain of the MOS transistor Q4.

The MOS transistor Q3 is connected between both terminals (P1, P2) of the switching circuit SWn. The resistor R3 is connected between the source and the drain of the MOS transistor Q4. The resistor R4 is connected between the source and the drain of the MOS transistor Q5. The sources of the MOS transistors Q9 and Q10 are connected to the ground level GND (negative electrode BAT−). The drain of the MOS transistor Q9 is connected to the drain of the MOS transistor Q4 via the MOS transistor Q6. The drain of the MOS transistor Q10 is connected to the drain of the MOS transistor Q5 via the MOS transistor Q7. A control signal SWOFF being supplied from the charge pump control circuit 141 is input into the gate of the MOS transistor Q9. A control signal SWON is input into the gate of the MOS transistor Q10 from the charge pump control circuit 141. The MOS transistor Q8 is connected in parallel with the MOS transistor Q9, and a control signal INTOFF is input into its gate.

According to the switching circuit SWn shown in FIG. 5, if the control signal SWON is at high level and the control signal SWOFF is at low level, the MOS transistor Q9 is turned on, and the MOS transistor Q10 is turned off. If the MOS transistor Q9 is turned on, since a current flows in the ground level GND (negative electrode BAT−) via the MOS transistors Q6 and Q9 from the resistor R3, a voltage drop is generated in the resistor R3, and the MOS transistor Q5 is turned on. If the MOS transistor Q5 is turned on, since the MOS transistor Q10 is turned off, the gate and the source of the MOS transistors Q3 and Q4 are short-circuited, so that the MOS transistors Q3 and Q4 are turned off. With the turning-off of the MOS transistor Q3, the switching circuit SWn is set in an off-state. On the other hand, if the control signal SWON is at low level and the control signal SWOFF is at high level, since the MOS transistor Q5 is turned off and the MOS transistors Q3 and Q4 are turned off by an operation opposite the above-mentioned operation, the switching circuit SWn is set in an on-state.

Also, in the switching circuit SWn shown in FIG. 5, since a fixed voltage VCLMP is supplied to the gates of the MOS transistors Q6 and Q7, as mentioned above, even if the switching circuit SWn is turned on and off, the potential of the sources of the MOS transistors Q6 and Q7 is clamped without being lowered to the ground level GND. In other words, if the threshold of the MOS transistors Q6 and Q7 is "Vth," since the MOS transistors Q6 and Q7 are turned off when the voltage of the sources of the MOS transistors Q6 and Q7 reaches "VCLMP+Vth," the sources of the MOS transistors Q6 and Q7 are not lower than its voltage.

Also, the control signal INITOFF is a signal that is set at a high level while the sub power supply circuit 130 completes the start, and for example, the control signal SUB_OK of the sub power supply start detecting circuit 131 and its logical inverting signal are used. If the control signal INITOFF is set at high level, the MOS transistor Q8 is turned on, and the MOS transistor Q3 is turned off. For this reason, in an initial state before the sub power supply circuit 130 completes the start, the off-state of the switching circuit SWn is guaranteed.

FIG. 4 will be explained below.

The resistors R1 and R2 are connected in series between the cathodes of the diodes D1 and D2 and the ground level GND. At the middle point of the connection of the resistors R1 and R2, a voltage V1 in which the voltage VDD is divided by a prescribed voltage dividing ratio is generated. The comparison circuit 141 compares the voltage V1 with the reference voltage VBG and outputs a signal VBT_DET corresponding to the comparison result. In other words, if the voltage V1 is higher than the reference voltage VBG, a high-level signal VBT_DET is output, and if the voltage V1 is lower than the reference voltage VBG, a low-level signal VBT_DET is output. Here, it is assumed that the voltage V1 after the voltage division is "Kv" times the voltage VDD. If the voltage VDD is "Vb1" when the voltage V1 is equal to the reference voltage VBG, "Vb1=VBG×Kv" is established.

Therefore, if the voltage VDD is higher than "Vb1," the comparison circuit 141 outputs the high-level signal VBT_DET, and if the voltage VDD is lower than "Vb1," the comparison circuit outputs the low-level signal VBT_DET.

The comparison circuit 142 compares the current detecting signal IO_SENS with the reference voltage VBG and outputs a signal IO_DET corresponding to the comparison result. In other words, if the current detecting signal IO_SENS is higher than the reference voltage VBG, a high-level signal IO_DET is output, and if the current detecting signal IO_SENS is lower than the reference voltage VBG, a low-level signal IO_DET is output.

Here, it is assumed that the voltage value of the current detecting signal IO_SENS is "Ki" times a current Io flowing in the MOS transistor Q11. If the current Io is "Io1" when the current detecting signal IO_SENS is equal to the reference voltage VBG, "Io1=VBG*Ki" is established.

Therefore, if the current Io is larger than "Io1," the comparison circuit 142 outputs the high-level signal IO_DET, and if the current Io is smaller than "Io1," the comparison circuit outputs the low-level signal IO_DET. Also, the comparison circuits 141 and 142 are operated by receiving the start-up voltage VSTUP of the setup circuit 113.

The charge pump control circuit 141 is a circuit for controlling the charge pump operation of the charge pump circuit 140A and generates a control signal for turning on and off each switching circuit (SW1-SW5). If the charge pump circuit 140A is operated in the through mode, the charge pump control circuit 141 sets the switching circuits SW1, SW2, SW3, and SW5 in the on-state and sets the switching circuit SW4 in the off-state. Thus, since the cathodes of the diodes D1 and D2 and the negative electrode BAT− are connected to the ends of the capacitor C3, the intermediate voltage VCPO is almost equal to the voltage VDD.

On the other hand, if the charge pump circuit 140A is operated in the ½ mode, the charge pump control circuit 141 turns on and off the switching circuits SW1 and SW4 by the same control signal Φ1 and turns on and off the switching circuits SW2, SW3, and SW5 by a control signal Φ2 with a phase opposite that of the control signal Φ1.

If the switching circuits SW1 and SW4 are turned on and the switching circuits SW2, SW3, and SW5 are turned off, the capacitors C1 and C2 are connected in series between the cathodes of the diodes D1 and D2 and the negative electrode BAT−, and the capacitor C3 is cut off from the cathodes of the diodes D1 and D2. If the electrostatic capacities of the capacitors C1 and C2 are almost equal, the voltages occurs the capacitors C1 and C2 are respectively about ½ of the voltage VDD.

On the other hand, if the switching circuits SW2, SW3, and SW5 are turned on and the switching circuits SW1 and SW4 are turned off, the capacitors C1 and C2 are connected in parallel to the capacitor C3, and this parallel circuit is cut off from the cathodes of the diodes D1 and D2. If the voltages across the capacitors C1 and C2 are respectively about ½ the voltage VDD, the voltage across the capacitor C3 is also about ½ the voltage VDD.

With repetition of this operation, the intermediate voltage VCPO being generated across the capacitor C3 is about ½ the voltage VDD. The charge pump control circuit 141 switches the above-mentioned through mode and ½ mode in accordance with the signals VBT_DET and IO_DET. In other words, if both the signals VBT_DET and IO_DET are at high level (if the voltage VDD is higher than "Vb1" and the current Io of the MOS transistor Q11 is larger than "Io1"), the charge pump control circuit 141 operates the charge pump circuit 140A in the ½ mode. On the other hand, if one or both of the signals VBT_DET and IO_DET are at low level (if the voltage VDD is lower than "Vb1" or if the current Io of the MOS transistor Q11 is smaller than "Io1"), the charge pump control circuit operates the charge pump circuit 140A in the through mode.

Next, the start sequence of the above-mentioned power supply circuit 116 will be explained referring to FIG. 6. FIG. 6 shows a timing example of each signal of the power supply circuit 116 at a time of starting.

(Step 1)
If a voltage is supplied to the setup circuit 113 from the battery cell B1 or electronic equipment 200, the start-up voltage VSTUP (FIG. 6(A)) is generated in the setup circuit 113. The reference voltage generating circuit 114 starts its operation by receiving the start-up voltage VSTUP, and the reference voltage VBG (FIG. 6(B)) rises (time t1).

(Step 2)
If the reference voltage VBG rises to a fixed level, the reference voltage generating circuit 114 outputs a signal BG_OK (FIG. 6(C)) and notifies a start completion (time t2).

(Step 3)
If the start completion of the reference voltage generating circuit 114 is notified by the signal BG_OK, the low-voltage operation lock circuit 115 generates a control signal xUVLO (FIG. 6(D)) showing that the voltage of the start-up voltage VSETUP has reached a prescribed voltage (time t3).

(Step 4)
If it is notified by the control signal xUVLO that the voltage of the positive electrode PAC+ has reached the prescribed voltage, the sub power supply circuit 130 and the first LDO start operation, and output voltages VSUB and VREG1 (FIGS. 6(E) and (H)) start to rise (time t4).

(Step 5)
If the power supply voltage VSUB (FIG. 6(E)) rises to a fixed level, the sub power supply start detecting circuit 131 notifies the start completion of the sub power supply circuit 130 by the signal SUB_OK (FIG. 6(F)) (time t5).

(Step 6)
If the start completion of the sub power supply circuit 130 is notified by the signal SUB_OK, the oscillating circuit 132 generates a clock signal (FIG. 6(G)), and the charge pump part 134 starts its operation (time t6).

(Step 7)
If the intermediate voltage VCPO being output from the charge pump part 134 rises, the power supply voltage VREG1 (FIG. 6(H)) being output by the first LDO 135 also rises in response to it. Then, if the power supply voltage VREG1 rises to a fixed level, the first LDO start detecting circuit 137 notifies the start completion of the first LDO 135 by the signal REG1_DET (FIG. 6(I)) (time t7).

(Step 8)

If the start completion of the first LDO 135 is notified by the signal REG1_DET, the second LDO 138 is started, and its output voltage VREG2 (FIG. 6(J)) starts to rise (time t8).

As explained above, according to this embodiment, if the comparison circuit 141 decides that the voltage V1 is higher than the reference voltage VBG (that is, if the voltage VDD is higher than the prescribed voltage "Vb1"), the charge pump circuit 140A is operated in "½ mode" (a step-down ratio of "2"), steps down the voltage VDD, and outputs the intermediate voltage VCPO.

Thus, the intermediate voltage VCPO being input into the first LDO 135 is about half that of the case where no step-down is carried out, and the power that is consumed in the MOS transistor Q11 (FIG. 3) of the first LDO 135 is greatly reduced. Therefore, the increase in power consumption of the first LDO 135 due to the voltage increase of the voltage VDD can be suppressed. Also, since the radiation means of the first LDO 135 can be reduced in size or omitted by the suppression of power consumption, the size and weight of the device can be reduced.

Furthermore, according to this embodiment, if the comparison circuit 142 decides that the current detecting signal IO_SENS is lower than the reference voltage VBG (that is, if the current Io of the MOS transistor Q11 is smaller than the prescribed current "Io1"), the charge pump circuit 140A is operated in "through mode" (a step-down ratio of "1") and outputs the voltage VDD as the intermediate voltage VCPO without stepping it down.

Thus, when the current Io is smaller than the prescribed current "Io1," since the power consumption of the MOS transistor Q11 is relatively small when the power consumption is reduced by stopping the step-down operation of the charge pump circuit 140A, a low power consumption of the entire device can be realized.

Also, if the charge pump circuit 140A is operated in "½ mode," since slight noise is generated, though it is different from the degree of a switching regulator, the noise can be reduced by switching the charge pump circuit 140A to "through mode."

Next, modified examples of the charge pump part 134 will be explained referring to FIGS. 7 and 8.

First Modified Example

Figure 7:
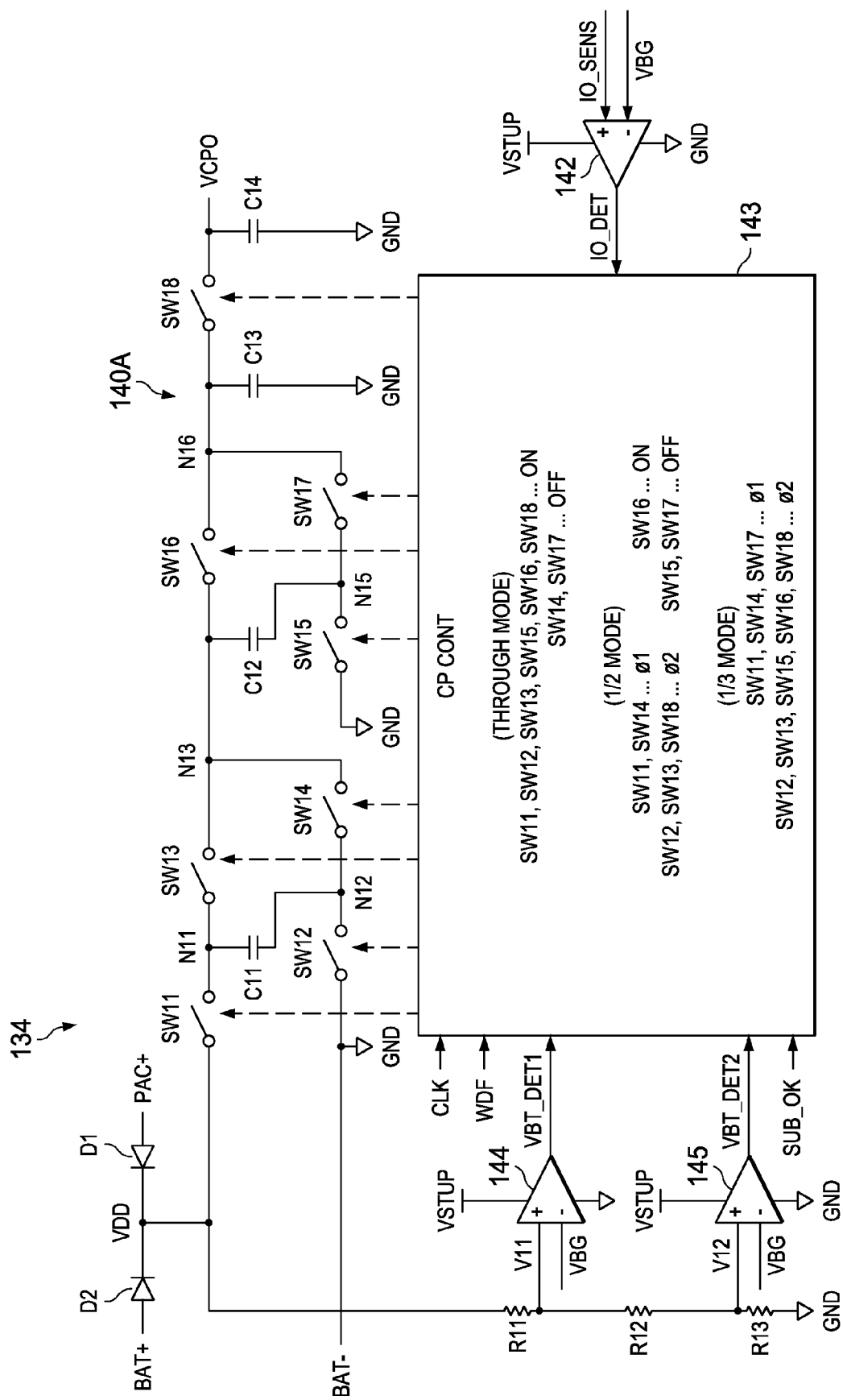
FIG. 7 shows a first modified example of the charge pump circuit.

FIG. 7 shows a first modified example of the charge pump part 134.

The charge pump part 134 shown in FIG. 7 has charge pump circuit 140A, charge pump control circuit 143, comparison circuits 142, 144, and 145, and resistors R11-R13. Also, the same symbols of FIGS. 5 and 7 show the same constitutional elements.

The charge pump circuit 140A has switching circuits SW11-SW18 and capacitors C11-C14. The charge pump circuit 140A is an example of the charge pump circuit of the present invention. The charge pump control circuit 143 is an example of the control circuit of the present invention. The circuit block including the resistors R1, R2, and R3 and the comparison circuits 144 and 145 is an example of the voltage detecting circuit of the present invention.

The charge pump circuit 140A carries out a charge pump operation according to the control of the charge pump control circuit 143, steps down the voltage VDD of the cathodes of the diodes D1 and D2 to about ½ or about ⅓, and outputs the stepped-down voltage as the intermediate voltage VCPO. Hereinafter, these operating modes are called "½ mode" and "⅓ mode," respectively.

Also, the charge pump circuit 140A, similarly to the above-mentioned charge pump circuit 140A, is provided with a "through mode" for outputting the voltage VDD as the intermediate voltage VCPO.

The switching circuit SW11 is connected between the cathodes of the diodes D1 and D2 and a node N11. The switching circuit SW12 is connected between the negative electrode BAT– of the battery B1 and a node N12. The switching circuit SW13 is connected between the nodes N11 and N13. The switching circuit SW14 is connected between the nodes N12 and N13. The switching circuit SW15 is connected to a node N15 and between the ground level GND and the node N15. The switching circuit SW16 is connected between the nodes N13 and N16. The switching circuit SW17 is connected between the nodes N15 and N16. The switching circuit SW18 is connected between the node N16 and the output terminal of the intermediate voltage VCPO. The capacitor C11 is connected between the nodes N11 and N12. The capacitor C12 is connected between the nodes N13 and N15. The capacitor C13 is connected between the node N16 and the ground level GND. The capacitor C14 is connected between the output terminal of the intermediate voltage VCPO and the ground level GND.

In the example of FIG. 7, the ground level GND has the same potential as that of the negative electrode BAT– of the battery B1.

The resistors R11, R12, and R13 are connected in series between the cathodes of the diodes D1 and D2 and the ground level GND. In other words, these three resistors are connected in series in the order of resistors R11, R12, and R13 from the cathodes of the diodes D1 and D2. At the middle point of the connection of the resistors R11 and R12, a voltage VII is generated, and a voltage V12 is generated at the middle point of the connection of the resistors R12 and R13.

The comparison circuit 144 compares the voltage VII with the reference voltage VBG and outputs a signal VBT_DET1 corresponding to the comparison result. In other words, if the voltage VII is higher than the reference voltage VBG, a high-level signal VBT_DET1 is output, and if the voltage VII is lower than the reference voltage VBG, a low-level signal VBT_DET1 is output.

The comparison circuit 145 compares the voltage V12 with the reference voltage VBG and outputs a signal VBT_DET2 corresponding to the comparison result. In other words, if the voltage V12 is higher than the reference voltage VBG, a high-level signal VBT_DET2 is output, and if the voltage V12 is lower than the reference voltage VBG, a low-level signal VBT_DET2 is output.

Here, it is assumed that the voltage V11 is "Kv1" times the voltage VDD and the voltage V12 is "Kv2" times the voltage VDD (Kv1>Kv2). In this case, when the voltage VII is equal to the reference voltage VBG, if the voltage VDD is "Vb11," "Vb11=VBG×Kv1" is established. Also, when the voltage V12 is equal to the reference voltage VBG, if the voltage VDD is "Vb12," "Vb12=VBG×Kv2" is established. "Vb11" is a voltage higher than "Vb12."

Therefore, if the voltage VDD is higher than "Vb11," both the signals VBT_DET1 and VBT_DET2 are at high level. If the voltage VDD is at a level between "Vb11" and "Vb12," the signal VBT_DET1 is at low level, and the signal VBT_DET2 is at high level. If the voltage VDD is at "Vb12," both signals VBT_DET1 and VBT_DET2 are at low level. Also, similar to the circuit with the same symbols in FIG. 4, if the current Io is larger than "Io1," the comparison circuit 142 outputs the high-level signal IO_DET, and if the current Io is smaller than "Io1," the comparison circuit outputs the low-level signal IO_DET. Also, the comparison circuits 144, 145, and 142 are operated by receiving the start-up voltage VSTUP of the setup circuit 113.

The charge pump control circuit 143 is a circuit for controlling the charge pump operation of the charge pump circuit 140A and generates a control signal for turning each switching circuit (SW11-SW18) on and off. If the charge pump circuit 140A is operated in the through mode, the charge pump control circuit 143 sets the switching circuits SW11, SW12, SW13, SW15, SW16, and SW18 in the on-state and sets the switching circuits SW4 and SW17 in the off-state. Thus, since the cathodes of the diodes D1 and D2 and the negative electrode BAT− are connected to the ends of the capacitor C14, the intermediate voltage VCPO is almost equal to the voltage VDD.

If the charge pump circuit 140A is operated in the ½ mode, the charge pump control circuit 143 turns the switching circuits SW11 and SW14 on and off by the same control signal ΦD1 and turns the switching circuits SW12, SW13, and SW18 on and off by a control signal Φ2 with a phase opposite that of the control signal Φ1. Also, the switching circuit SW16 is always turned on, and the switching circuits SW15 and SW17 are always turned off.

Here, if the switching circuits SW11, SW12, SW13, SW14, and SW18 are respectively regarded as the switching circuits SW1, SW2, SW3, SW4, and SW5 and the capacitors, C11, C13, and C14 are respectively regarded as the capacitors C1, C2, and C3, the circuit constitution of the charge pump circuit 140A of FIG. 7 is equivalent to the charge pump circuit 140A of FIG. 4, so that the control signals of each switch are also equal. Therefore, if the charge pump circuit 140A is operated in the ½ mode, the intermediate voltage VCPO being generated in the capacitor C3 is about ½ the voltage VDD. If the charge pump circuit 140A is operated in ⅓ mode, the charge pump control circuit 143 turns the switching circuits SW11, SW14, and SW17 on and off by the same control signal Φ1 and turns the switching circuits SW12, SW13, SW15, SW16, and SW18 on and off by a control signal Φ2 with a phase opposite that of the control signal Φ1.

If the switching circuits SW11, SW14, and SW17 are turned on and the switching circuits SW12, SW13, SW15, SW16, and SW18 are turned off, the capacitors C11, C12, and C13 are connected in series between the cathodes of the diodes D1 and D2 and the negative electrode BAT−, and the capacitor C14 is cut off from the cathodes of the diodes D1 and D2. If the electrostatic capacities of the capacitors C11, C12, and C13 are almost equal, the voltages across the capacitors C11, C12, and C13 are respectively about ⅓ of the voltage VDD.

On the other hand, if the switching circuits SW12, SW13, SW15, SW16, and SW18 are turned on and the switching circuits SW11, SW14, SW17 are turned off, the capacitors C11, C12, and C13 are connected in parallel to the capacitor C14, and this parallel circuit is cut off from the cathodes of the diodes D1 and D2. If the voltages across the capacitors C11, C12, and C13 are respectively about ⅓ the voltage VDD, the voltage of the capacitor C14 is also about ⅓ the voltage VDD. With repetition of this operation, the intermediate voltage VCPO being generated across the capacitor C3 is about ⅓ the voltage VDD.

The charge pump control circuit 143 switches the above-mentioned through mode, ½ mode, and ⅓ mode in accordance with the signals VBT_DET1, VBT_DET2, and IO_DET. In other words, if both the signals VBT_DET1 and VBT_DET2 are at high level (if the voltage VDD is higher than "Vb11"), the charge pump control circuit 141 operates the charge pump circuit 140A in the ⅓ mode (a step-down ratio of "3"). If the signal VBT_DET1 is at low level and the signal VBT_DET2 is at high level (if the voltage VDD is between "Vb11" and "Vb12"), the charge pump control circuit operates the charge pump circuit 140A in the ½ mode (a step-down ratio of "2"). If both the signals VBT_DET1 and VBT_DET2 are at low level (if the voltage VDD is lower than "Vb12"), the charge pump control circuit operates the charge pump circuit 140A in the through mode (a step-down ratio of "1").

However, if the signal IO_DET is at low level (if the current Io of the MOS transistor Q11 is smaller than "Io1"), the charge pump control circuit operates the charge pump circuit 140A in the through mode, regardless of the above-mentioned conditions.

As mentioned above, according to the first modified example shown in FIG. 7, the comparison circuits 144 and 145 judge three voltage ranges ("VDD>Vb11," "Vb11>VDD>Vb12," and "Vb12>VDD") of the voltage VDD in accordance with the signals VBT_DET1 and VBE_DET2 that are output, and when a voltage range of the judgment result is a high potential, the charge pump circuit 140A carries out a step-down operation in an operating mode (⅓ mode, ½ mode, and through mode") with a large step-down ratio.

Thus, even if the voltage VDD rises, since rise of the intermediate voltage VCPO is suppressed by an increase in the step-down ratio of the charge pump circuit 140A, an increase in power consumption of the first LDO 135 can be suppressed. Also, since the radiation means of the first LDO 135 can be reduced in size or omitted by suppression of the power consumption, the size and weight of the device can be reduced.

Furthermore, according to this embodiment, if the comparison circuit 142 decides that the current detecting signal IO_SENS is lower than the reference voltage VBG (that is, if the current Io of the MOS transistor Q11 is smaller than the prescribed current "Io1"), since the charge pump circuit 140A is operated in the "through mode" (a step-down ratio of "1"), the power consumption required for the step-down operation of the chare pump circuit 140A can be reduced, and noise can be reduced.

The first modified example of the charge pump part 134 was explained above.

Second Modified Example

Figure 8:
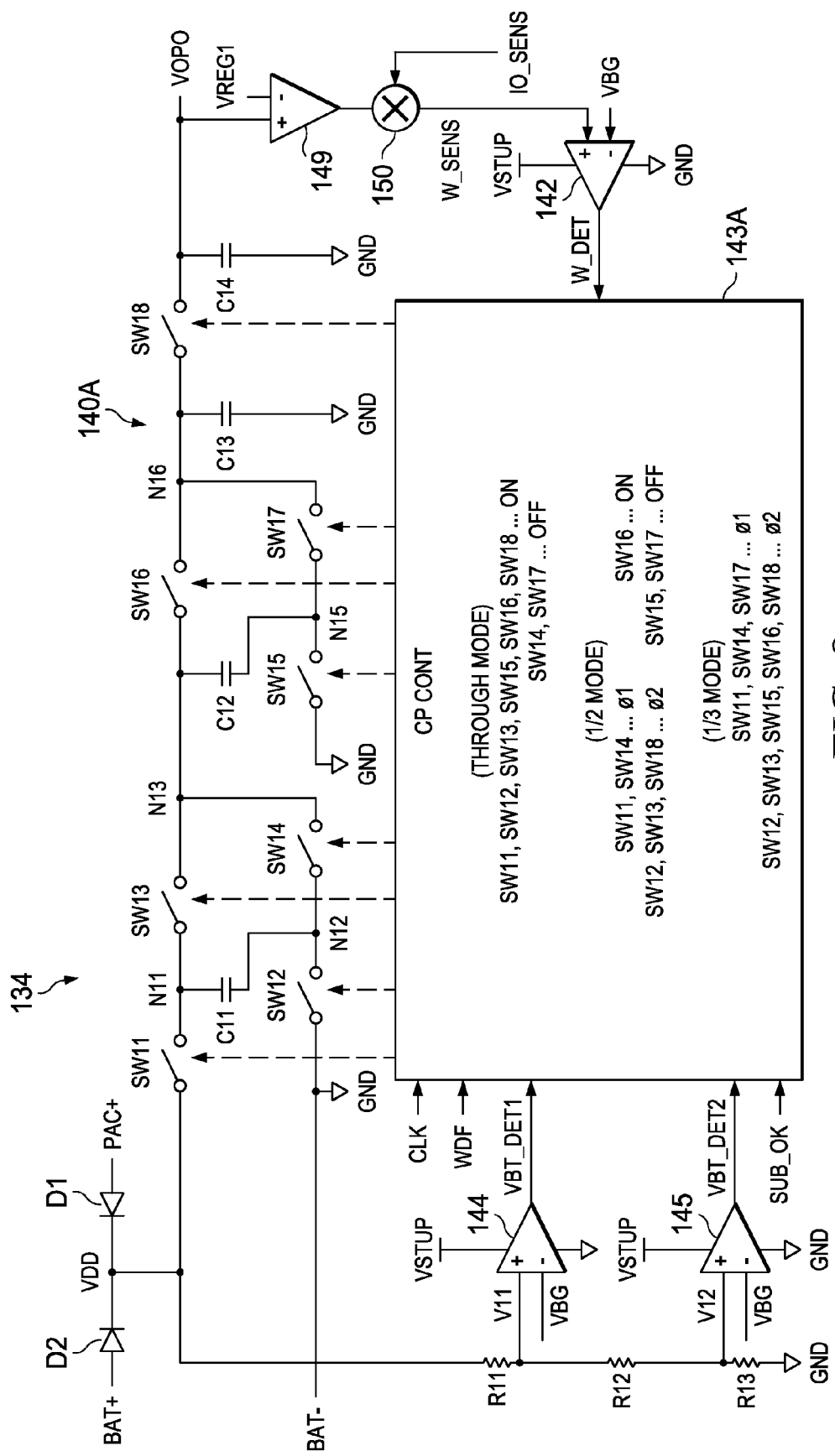
FIG. 8 shows a second modified example of the charge pump circuit.

FIG. 8 shows a second modified example of the charge pump part 134.

The charge pump part 134 shown in FIG. 8 has charge pump circuit 140A, comparison circuits 144, and 145, and resistors R11-R13 as constitutional elements that are the same as those of the first modified example shown in FIG. 7 and has charge pump control circuit 143A, comparison circuit 148, differential amplifying circuit 149, and multiplying circuit 150 as constitutional elements different from those of first modified example.

The circuit block including the current detecting signal generating circuit 136 (FIG. 2), comparison circuit 148, differential amplifying circuit 149, and multiplying circuit 150 is an example of the power detecting circuit of the present invention. The differential amplifying circuit 149 amplifies the difference between the input voltage and the output voltage of the first LDO 135, that is, the difference between the intermediate voltage VCPO and the power supply voltage VREG1. The multiplying circuit 150 multiplies the current detecting signal IO_SENS by the output signal of the differential amplifying circuit 149 and outputs the multiplication result as a power detecting signal W_SENS. The comparison circuit 148 compares the power detecting signal W_SENS with the reference voltage VBG and outputs the comparison result as a signal W_DET. In other words, if the power detecting signal W_SENS is higher than the reference voltage VBG, a high-level signal W_DET is output, and if the power detecting signal W_SENS is lower than the reference voltage VBG, a low-level signal.

Here, it is assumed that the voltage value of the power detecting signal W_SENS is "Kw" times the power Wo being consumed by the MOS transistor Q11 (FIG. 3) of the first LDO 135. In this case, when the power detecting signal W_SENS is equal to the reference voltage VBG, if the power Wo being consumed is "Wo1," "Wo1=VBG×Kw" is established.

Therefore, if the power Wo is larger than "Wo1," the comparison circuit 148 outputs the high-level signal W_DET, and if the power Wo is smaller than "Wo1," the comparison circuit outputs the low-level signal W_DET.

The charge pump control circuit 143A switches the above-mentioned through mode, ½ mode, and ⅓ mode of the charge pump circuit 140A in accordance with the signals VBT_DET1, VBT_DET2, and W_DET. In other words, if both the signals VBT_DET1 and VBT_DET2 are at high level (if the voltage VDD is higher than "Vb11"), the charge pump control circuit 143A determines the operating mode of the charge pump circuit 140A among the operating modes (that is, all the operating modes) with a step-down ratio of "3" or less so that the signal W_DET is at low level (the power Wo is smaller than "Wo1").

Also, if the signal VBT_DET1 is at high level and the signal VBT_DET2 is at low level (if the voltage VDD is lower than "Vb11" and higher than "Vb12"), the charge pump control circuit 143A determines the operating mode of the charge pump circuit 140A among the operating modes (½ mode or through mode) with a step-down ratio of "2" or less so that the signal W_DET is at low level (the power Wo is smaller than "Wo1").

Furthermore, if both the signals VBT_DET1 and VBT_DET2 are at low level (if the voltage VDD is lower than "Vb12"), the charge pump control circuit 143A operates the charge pump circuit 140A in an operating mode (only the through mode) with a step-down ratio of "1" or less. However, if the signal IO_DET is at low level (if the current Io of the MOS transistor Q11 is smaller than "Io1"), the charge pump control circuit operates the charge pump circuit 140A in the through mode, regardless of the above-mentioned conditions.

As mentioned above, according to the second modified example shown in FIG. 8, the comparison circuits 144 and 145 judge three voltage ranges ("VDD>Vb11," "Vb11>VDD>Vb12," and "Vb12>VDD") of the voltage VDD in accordance with the signals VBT_DET1 and VBE_DET2 being output. Then, if the power Wo being consumed by the MOS transistor Q11 (FIG. 3) is larger than "Wo1," the operating mode of the charge pump circuit 140A is switched so that the step-down ratio of the charge pump circuit 140A does not result in the allowable upper limit of the voltage range of said judgment results being exceeded and the power Wo being consumed is smaller than "Wo1." Thus, even if the voltage VDD is changed in any way, since the power Wo being consumed by the MOS transistor Q11 is smaller than "Wo1" through switching of the operating mode of the charge pump circuit 140A, the increase in power consumption due to an increase in the voltage of the voltage VDD can be effectively suppressed.

Also, if the load current of the first LDO 135 is greatly changed and the voltage drop of the MOS transistor Q11 (FIG. 3) is greatly changed in response to it, the intermediate voltage VCPO being input into the first LDO 135 is also greatly changed. In order to normally generate the power supply voltage VREG1 in the first LDO 135, it is necessary for the intermediate voltage VCPO to be higher than a certain fixed lower limit value. In the first modified example, since the step-down ratio is constantly maintained when the voltage VDD is included in a fixed voltage range, it is necessary to consider a larger margin between the intermediate voltage VCPO and the lower limit value so that the intermediate voltage VCPO will not be lower than the lower limit value by a change in the load.

On the other hand, in the second modified example shown in FIG. 8, even if the voltage VDD is included in a fixed voltage range, since the step-down ratio is appropriately changed so that the power Wo being consumed by the MOS transistor Q11 is smaller than "Wo1," the above-mentioned margin can be reduced. Thus, since the step-down ratio of the charge pump circuit 140A can be finely changed in accordance with the power Wo being consumed by the MOS transistor Q11, the power consumption can be further reduced.

Above, an embodiment of the present invention been explained, but the present invention is not limited to only the above-mentioned embodiment but further includes various variations. In the above-mentioned embodiment, the operating mode of the charge pump circuit 140A (140A) was switched in accordance with the voltage VDD, but without being limited to this, for example, the operating mode may be switched in accordance with the input and output voltage (the voltage of MOS transistor Q11) of the first LDO.

In the above-mentioned embodiment, the current detecting signal IO_SENS corresponding to the current flowing in the MOS transistor Q11 of the first LDO 135 was generated in the current detecting signal generating circuit 136, but the present invention is not limited to this. Since the current detecting signal IO_SENS may be a signal corresponding to the current flowing in the MOS transistor Q11, for example, the current detecting signal IO_SENS corresponding to the current flowing in the MOS transistor Q11 can also be generated based on the input current and the output current of the charge pump circuits (140A, 140A). If the input current of the charge pump circuit is detected, for example, if the input current is detected at the charge timing of electric charging of a capacitor in the charge pump circuit and is averaged by integration processing, etc., a current detecting signal IO_SENS corresponding to the current flowing in the MOS transistor Q11 can be generated.

In the above-mentioned embodiment, an example of a constitution in which the LDO is installed at the rear stage of the charge pump circuit was given, but the present invention is not limited to this. For example, in a regulated charge pump circuit in which the charge pump circuit and the LDO are integrated, the operating mode (step-down ratio) may also be switched in accordance with the input voltage.

In the above-mentioned embodiment, an example in which the charge pump circuit can select a step-down ratio from "1" to "3" has been mentioned, but without being limited to this, a charge pump circuit that can select a step-down ratio of 4 or more may also be employed.

While the invention has been particularly shown and described with reference to preferred embodiments thereof it is well understood by those skilled in the art that various changes and modifications can be made in the invention without departing from the spirit and scope of the invention as defined by the appended claims.

The invention claimed is:

1. A power supply circuit, that steps down an input voltage and outputs it, comprising:
   a charge pump circuit for outputting an intermediate voltage in which the input voltage has been stepped down;
   a voltage regulator circuit including an active element circuit being connected between an output terminal of the intermediate voltage of the charge pump circuit and an output terminal of the power supply voltage and a feedback control circuit for feedback-controlling the active element circuit so that the power supply voltage approaches a predetermined voltage;
   a voltage detecting circuit for detecting said input voltage or the voltage being applied to the active element circuit;
   a control circuit that switches the operating mode of the charge pump circuit so that the step-down ratio is increased if the voltage being detected in the voltage detecting circuit exceeds a predetermined voltage threshold; and
   a power detecting circuit for detecting the power being consumed in the active element circuit; the charge pump circuit has several operating modes with different step-down ratios; and the control circuit judges whether or not the voltage being detected in the voltage detecting circuit is included in any of several predetermined voltage ranges and switches the operating mode of the charge pump circuit so that it is operated at a step-down ratio in which the allowable upper limit for a voltage range of said judgment result is not exceeded and a step-down ratio in which the power consumption being detected is smaller than a predetermined power threshold, if the power consumption being detected in the power detecting circuit is larger than the predetermined power threshold.

2. The power supply circuit of claim 1, comprising a current detecting circuit for detecting a current in the active element circuit is provided; and
   wherein the control circuit sets the operating mode of the charge pump circuit so that the input voltage is stepped down if the voltage being detected in the voltage detecting circuit is higher than the predetermined voltage threshold and the current being detected in the current detecting circuit is higher than a predetermined current threshold, and sets the operating mode of the charge pump circuit so that the input voltage is output as the intermediate voltage without being stepped down if the voltage being detected in the voltage detecting circuit is lower than the predetermined voltage threshold or the current being detected in the current detecting circuit is lower than the predetermined current threshold.

3. The power supply circuit of claim 1, wherein the control circuit sets the operating mode of the charge pump circuit so that the input voltage is output without being stepped down if the input voltage being detected in the voltage detecting circuit is lower than the predetermined voltage threshold or the power consumption being detected in the power detecting circuit is smaller than the predetermined power threshold.

4. In a battery device, equipped with a battery, a switching circuit installed in a power supply path comprising:
   a battery protecting circuit for controlling on/off of the switching circuit in accordance with a control signal being input;
   a power supply circuit that steps down the voltage of the battery and supplies the stepped-down voltage as a power supply voltage to the battery protecting circuit, the power supply circuit having a charge pump circuit for outputting an intermediate voltage in which the voltage of the battery has been stepped down;
   a voltage regulator circuit having an active element circuit connected between an output terminal of the intermediate voltage of the charge pump circuit and an output terminal of the power supply voltage and a feedback control circuit for feedback-controlling the active element circuit so that the power supply voltage approaches a predetermined voltage;
   a voltage detecting circuit for detecting the voltage of the battery or the voltage being applied to the active element circuit;
   a control circuit that switches the operating mode of the charge pump circuit so that the step-down ratio is increased if the voltage being detected in the a voltage detecting circuit exceeds a predetermined voltage threshold; and
   a power detecting circuit for detecting the power being consumed in the active element circuit; the charge pump circuit has several operating modes with different step-down ratios; and the control circuit judges whether or not the voltage being detected in the voltage detecting circuit is included in any of several predetermined voltage ranges and switches the operating mode of the charge pump circuit so that it is operated at a step-down ratio in which the allowable upper limit for a voltage range of said judgment result is not exceeded and a step-down ratio in which the power consumption being detected is smaller than a predetermined power threshold, if the power consumption being detected in the power detecting circuit is larger than the predetermined power threshold.

* * * * *